United States Patent
Bodnar

(10) Patent No.: US 6,536,009 B1
(45) Date of Patent: Mar. 18, 2003

(54) TECHNIQUE FOR GENERATING SINGLE-BIT ERROR-CORRECTING, TWO-BIT BURST ERROR-DETECTING CODES

(75) Inventor: Lance M. Bodnar, San Diego, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/573,635

(22) Filed: May 17, 2000

(51) Int. Cl.[7] .............................................. H03M 13/00
(52) U.S. Cl. ....................... 714/762; 714/761; 714/753; 714/758
(58) Field of Search ................................. 714/758, 765, 714/773, 760, 763, 768, 759, 753, 761, 762; 365/154

(56) References Cited

U.S. PATENT DOCUMENTS

| | | | |
|---|---|---|---|
| 4,345,328 A | 8/1982 | White | 371/38 |
| 4,523,314 A | 6/1985 | Burns et al. | 371/38 |
| 4,905,242 A | 2/1990 | Popp | 371/40.1 |
| 5,315,544 A | 5/1994 | Yokote et al. | 365/154 |
| 5,457,702 A | 10/1995 | Williams et al. | 371/379 |
| 5,490,155 A | * 2/1996 | Abdoo et al. | 714/763 |
| 5,740,188 A | * 4/1998 | Olarig | 714/763 |
| 5,841,795 A | * 11/1998 | Olarig et al. | 714/768 |
| 5,938,773 A | * 8/1999 | Hauck et al. | 714/6 |
| 6,219,817 B1 | * 4/2001 | Holman | 714/785 |

OTHER PUBLICATIONS

Hsiao, "A Class of Optimal Minimum Odd–weight–column SED–DED Codes," *IBM J. Res. Develop.*, Jul. 14, 1970, pp. 395–401.

Lin et al., *Error Control Coding: Fundamentals and Applications*, Chapter 16, "Applications of Block Codes for Error Control in Data Storage Systems," Prentice–Hall, Inc., 1983.

* cited by examiner

*Primary Examiner*—David Ton
(74) *Attorney, Agent, or Firm*—Antonelli, Terry, Stout & Kraus LLP

(57) ABSTRACT

A method for generating correction codes that can correct a single error and detect two adjacent errors in an information word for a range of (n, k) values, where k denotes the length of the information word in bits and n denotes the length of the coded information word in bits. The method generates a parity check matrix, then multiplies a received word by the parity check matrix to produce a syndrome corresponding to one of two mutually exclusive sets of syndromes if the word contains at least one error. Information in the word is corrected by inverting a bit containing an error if the produced syndrome corresponds to one of the sets of syndromes. An uncorrectable two bit adjacent error is reported if the produced syndrome corresponds to the other of the two sets of syndromes and no error is reported if the produced syndrome contains all zeros.

8 Claims, 3 Drawing Sheets

H = [0 1 2 3 7 11 13 9 12 14]
D = [4 5 6 8 10]

$$H = \begin{bmatrix} 1 & 0 & 0 & 0 & 1 & 0 & 1 & 0 & 1 & 1 \\ 0 & 1 & 0 & 0 & 1 & 1 & 0 & 1 & 1 & 0 \\ 0 & 0 & 1 & 0 & 0 & 1 & 1 & 0 & 1 & 0 \\ 0 & 0 & 0 & 1 & 1 & 1 & 1 & 1 & 1 & 1 \end{bmatrix}$$

TECHNIQUE FOR GENERATING SINGLE-BIT ERROR-CORRECTING, TWO-BIT BURST ERROR-DETECTING CODES

BACKGROUND OF THE INVENTION

1. Field of the Invention

The present invention relates to a technique for generating correction codes and more particularly, the present invention relates to a technique for generating correction codes that can correct a single error and detect two adjacent errors in an information word for a range of (n, k) values, where k denotes the length of the information word in bits and n denotes the length of the coded information word in bits.

2. Description of the Related Art

A microprocessor executing software and utilizing RAMs (Random Access Memories) can experience single and adjacent bit errors from high-energy particles impacting the RAMs. Previous attempts to alleviate these errors involved using error correction codes. However, these error correction codes substantially increase the number of bits which must be added to the base microprocessor word width. This both increases the amount of RAM needed as well as slowing the processing time due to the increased word length and increased processing time needed for error correction.

Furthermore, digital communication techniques are now widely being used in many areas today including digital telephony, digital cable TV transmission, and the Internet. All of these digital communication techniques have required the use of error correction and error detection to correct for noise and interference in the communication path.

There have been many previous attempts to formulate error correction codes, particularly single bit error correcting-double bit error detecting codes. One such attempt is disclosed in an article entitled: "A Class of Optimal Minimum Odd-Weight-Column SEC-DED Codes," by M. Y. Hsaio, *IBM J. Res. Dev.*, Jul. 14, 1970.

While the technique of Hsaio results in useful correction codes, the addition of the number of parity bits needed for error detection and correction by the Hsaio technique often results in too high an overhead, thereby rendering the technique of Hsaio unusable in certain applications.

U.S. Pat. No. 4,345,328 to White discloses an apparatus for and method of providing single bit error correction and double bit error detection using through checking parity bits. A coding scheme is implemented which uses through checking parity bits appended to each byte as check bits. The remaining check bits are generated such that the combination of through checking parity bits and remaining check bits together provide single bit error correction and double bit error detection. While the scheme of White is useful, it is considerably more complex in handling certain types of double bit errors than that of the present invention.

U.S. Pat. No. 4,905,242 to Popp discloses an error detection and correction apparatus utilizing seven internally generated check bits which are applied to incoming data signals on the next clock. The technique of Popp uses a reduced set of check bits to only handle single bit errors in order to reduce the complexity of the technique and is able to pipeline the error checking activity. The present invention, on the other hand, is likewise of low complexity, yet adds double burst error detection.

U.S. Pat. No. 5,457,702 to Williams et al. discloses a system for correcting a single bit error and detecting burst errors. The technique of Williams et al. uses a complex set of error checking bits to increase the error checking performance to handle burst errors but at the high overhead due to the large number of check bits needed for the technique. On the other hand, the technique of the present invention takes a different approach so as to detect certain types of burst errors with less complexity and more efficiency.

U.S. Pat. No. 4,523,314 to Burns et al. discloses an improved error indicating system utilizing adder circuits for use with an error correction code system capable of detecting and indicating multiple bits errors and detecting and correcting single bit errors. As with the above-cited patents, Burns et al. system is more complex than that of the present invention.

SUMMARY OF THE INVENTION

A technique for generating correction codes that can correct a single error and detect two adjacent errors in an information word for a range of (n, k) values, where k denotes the length of the information word in bits and n denotes the length of the coded information word in bits, first generates a parity check matrix. Upon generating the parity check matrix, a received word is multiplied by the parity check matrix to produce a syndrome corresponding to one of two mutually exclusive sets of syndromes if the word contains at least one error, each single bit error in the word corresponding one-to-one with a member of the first of two sets of syndromes and each two bit adjacent error corresponding non-uniquely to a member of the other set of syndromes and a syndrome containing all zeros if the word contains no errors. The actual information in the word is corrected by inverting a bit containing an error if the produced syndrome corresponds to one of the sets of syndromes and an uncorrectable two bit adjacent error is reported if the produced syndromes corresponds to the other of the two sets of syndromes and no error is reported if the produced syndrome contains all zeros.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1A:
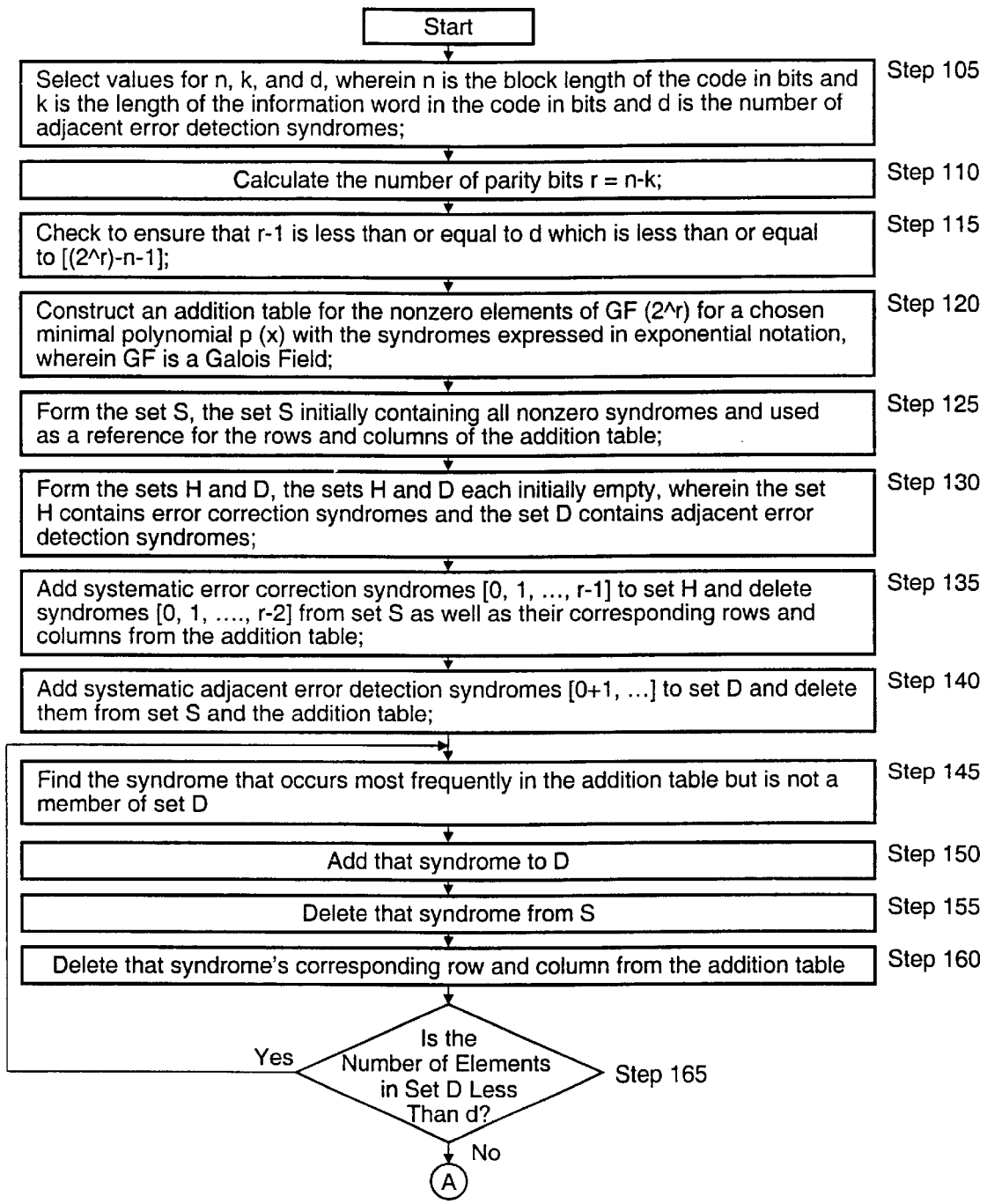
FIG. 1 is a flowchart illustrating a technique for generating a parity check matrix in accordance with an example embodiment of the present invention.

Before beginning a detailed description of the subject invention, mention of the following is in order. When appropriate, like reference numerals and characters may be used to designate identical, corresponding, or similar components in differing drawing figures. Furthermore, in the detail description to follow, example sizes/models/values/ranges may be given, although the present invention is not limited thereto. In addition, well-known components and elements have been omitted from the drawing figures for simplicity of illustration and discussion and so as not to obscure the invention.

A linear block code is completely described by its parity check matrix H, and the present invention constructs codes which will correct a single error and detect errors in two adjacent bits by describing the structure of their parity check matrices.

For any binary linear block code with a k bit information word length and an n bit blocklength, H will be an (n–k) row by n column matrix of binary digits. A length k row vector of information bits i is encoded into a length n codeword c, where n>k. The code inserts r=n–k bits of parity in each codeword.

In general, a row vector c is a valid codeword if and only if:

$$cH^T = 0_{1 \times r}$$

where $0_{1 \times r}$ is a 1 by r row vector of zeros, and the superscript T indicates the transposition of the preceding matrix, in this case, H.

A codeword is generated from a row vector of information bits i using a k row by n column generator matrix G. G must satisfy the condition:

$$GH^T = 0_{k \times r}.$$

The codeword is produced by multiplying i and G:

$$c = iG.$$

It is well known that if the code is systematic, that is, all the information bits from i appear unaltered and in the same order in the codeword c, then G can be constructed from H. The requirement for G and the relationship between G and H when they describe a binary systematic code is:

$$G = [P^T I_k]$$

$$H = [I_r P].$$

where P is an r by k matrix and $I_x$ is the x by x identity matrix. Systematic codes aid in the ease of decoding, and the codes developed below will all be binary systematic codes.

If some event causes errors to occur in a stored codeword, the result is r=c+e, where the $i^{th}$ bit of e is 1 if an error has occurred in that bit and a 0 if no error has occurred. All sums are performed in modulo 2, which is equivalent to a bitwise XOR (Exclusive OR) of the vectors. If one or more errors occurs, then e is nonzero, and $$rH^T = (c+e)H^T + eH^T = 0_{1 \times r} + s = s.$$

where the nonzero 1 by r row vector s is called the syndrome for the error pattern e. The calculation above, or syndrome computation, is used to detect errors in the codeword. Note that s depends only on the error pattern e and not the codeword c. Also note that if e happens to be a valid codeword, then $s=0_{1 \times r}$, and the error is undetected, since this is the condition given above for a valid codeword.

If only one error occurs in a codeword, then only one bit position of e will contain a 1. If the $i^{th}$ bit of e is 1, then it is easy to see that $eH^T = s$ will simply be the $i^{th}$ column of H. If e is a weight 2 error pattern, say bits i and j are 1, then $eH^T = s$ will be the modulo 2 sum of columns i and j of H. Each column of H can be viewed as an r-bit number or an element from $GF(2^r)$. There are $2^r-1$ possibilities for the n columns of H, each a nonzero member of $GF(2^r)$. The all zeros syndrome is excluded, again, since it indicates no error is present in the codeword.

The requirements on H to describe a code that will correct a single error and detect errors in any two adjacent bit positions are as follows:

1. Each column of H must be a unique, nonzero r-bit binary number or, equivalently, a nonzero element of $GF(2^r)$. This ensures that any single error will produce a unique syndrome and will, therefore, be correctable. Each column of H is an error correction syndrome.

2. Since H has n columns, n syndromes are needed to form the columns of H and the remaining $2^r-n-1$ syndromes do not appear in H. These remaining $2^r-n-1$ syndromes are error detection syndromes. If the result of the syndrome computation s is one of the error detection syndromes, then multiple errors have occurred in c. This is because if the codeword contained no errors, the syndrome computation would produce the all-zeros syndrome; and, if it contained a single error, the computation would produce one of the error correction syndromes. As described above, if two adjacent bits are in error, then the resulting syndrome will be the modulo 2 sum of the corresponding adjacent columns of H. Now, if the columns of H are arranged such that the modulo 2 sum of any two adjacent columns is one of the error detection syndromes, then the code will detect any two adjacent errors.

3. The condition for a systematic code, described above, requires that the first r columns of H form an r by r identity matrix $I_r$. This condition specifies r of the n error correction syndromes—(100 . . . 00) through (000 . . . 01) and r–1 of the $2^r-n-1$ error detection syndromes—(110 . . . 00) through (000 . . . 11).

To summarize, in order to form the parity check matrix H for this code, the set of $2^r-1$ nonzero syndromes must be partitioned into two smaller sets. The first will be the set of n error correction syndromes; the second will be the set of $2^r-n-1$ error detection syndromes. The two sets must be chosen such that the modulo 2 sum of any two of the error correction syndromes placed adjacent to each other in the parity check matrix is one of the error detection syndromes. It is important to note that it is not required that every error detection syndrome be the sum of two adjacent columns of H, only that every pair of adjacent columns of H sum to one of the error detection syndromes. Error detection syndromes that are the sum of two adjacent columns of H are called adjacent error detection syndromes. Finally, to form a systematic code, the first r error correction syndromes and first r–1 error detection syndromes are chosen in the manner noted above.

The strategy behind the present invention to produce the codes described above for various (n, k) is to first partition the set S of nonzero syndromes into the set H of correction syndromes and the set D of detection syndromes. The partitioning is performed using a greedy strategy based on the frequency of a syndrome's appearance in the syndrome addition table. Once this is done, the members of set H are ordered to produce the parity check matrix H. This ordering operation is accomplished by viewing each member of H as a vertex in an undirected graph G, and attempting to find a Hamiltonian path in the graph. A detailed description of all these operations follows.

An undirected graph such as G is a graph where an edge can be traveled in either direction: from vertex u to vertex v or from vertex v to vertex u. In a directed graph, this is not the case: an edge can be traveled in only one direction. Two vertices in G are connected by an undirected edge if the modulo 2 sum of those two vertices is one of the members of D. This means that the sum of the vertices is one of the adjacent error detection syndromes, and those two vertices (error correction syndromes) may be placed adjacent to each other in the parity check matrix for the code.

If the algorithm can find a path that visits each vertex in the graph exactly once, known in graph theory as a Hamiltonian path, then that path gives the order in which the error correction syndromes may be placed to form the parity check matrix for the code.

The problem of finding a Hamiltonian path in a general graph G has been proven to be an NP-complete problem in theoretical computer science. This essentially means that there is no quicker method to search for a Hamiltonian path in a general graph than by brute force examination of every possible path. No attempt was made to write an efficient algorithm to search for Hamiltonian paths in the graphs generated by this code search problem. Rather, the present invention provides an algorithm to produce error-correcting codes which employs a Hamiltonian path search. If there is a more efficient search procedure which exploits an underlying structure of the graphs produced here (or if someone proves that P=NP!), then that procedure may be plugged seamlessly into the algorithm to find codes. This will not change the scope of the invention, only the relative ease and speed with which codes may be generated. Indeed, codes that may be too long to find with a brute force search algorithm may be generated quickly and without trouble with other Hamiltonian path search procedures.

The algorithm to construct codes has been written in the M-file language of the mathematics software package MATLAB®. MATLAB® provides a toolbox with built-in functions that perform Galois field arithmetic. To take advantage of this feature, all syndromes were viewed as members of the Galois field with $2^r$ elements, commonly abbreviated as $GF(2^r)$. In order to clarify what follows, an extremely brief synopsis of Galois field notation is provided below.

In Galois field arithmetic, a nonzero r-bit binary number is viewed as a degree r-1 polynomial in a primitive element $\alpha$, or alternately as a power of that primitive element $\alpha$ from $\alpha^0$ to $\alpha^{2^r-2}$. For example, the binary number 0100 is the polynomial $0\alpha^0+1\alpha^1+0\alpha^2+0\alpha^3$, or just $\alpha^1$. This representation is dependent on the choice of a minimal polynomial $p(x)$ used to generate the field. The minimal polynomial has degree r and the property that $p(\alpha)=0$, and there are generally several choices of $p(x)$ for a given r, each generating a different representation of the same field.

Addition of Galois field elements is most easily performed when they are expressed as polynomials. The sum of two field elements is simply a term by term XOR (exclusive OR) of their coefficients. For example, the sum of $0\alpha^0+1\alpha^1+1\alpha^2$ and $1\alpha^0+1\alpha^1+0\alpha^2$ is $1\alpha^0+0\alpha^1+1\alpha^2$.

The power, or exponential, representation lends itself to straightforward multiplication of two elements. The exponent of the product of two elements is just the sum of the powers of the multiplicands, modulo $2^r-2$. For example, if r=3, $\alpha^4\alpha^5=\text{mod}_6(\alpha^9)=\alpha^3$.

As a second example, the binary number 1100 can be expressed as $1+1\alpha+0\alpha^2+0\alpha^3$. If we choose $p(x)=1+x+x^4$, (1100) is equivalent to $\alpha^4$ in the exponential representation of field elements. The fact that $p(\alpha)=0$ is confirmed by substituting $\alpha$ into $p(x)$, which evaluates to $p(\alpha)=1+\alpha+\alpha^4=$ (1000)+(0100)+(1100)=0.

The syndromes of the code will be described as powers of a primitive element (exponential notation) here unless otherwise noted, and the minimal polynomial $p(x)$ used to generate the field will always be specified. As shorthand, the element $\alpha^i$ will be labeled i here, and the polynomial $a_0+a_1\alpha^{-1}+ \ldots +a_{r-1}\alpha^{r-1}$ will be labeled $(a_0 a_1 \ldots a_{r-1})$. Conversion from the exponential to polynomial form can be accomplished by computing $\text{mod}_{p(x)}(\alpha^i)$.

The MATLAB®—files keep track of all syndromes in exponential notation to minimize the size of the arrays stored and also to improve readability of the output. The exponential form is more compact and will be used for this reason. Once a parity check matrix has been found, it is an easy task to convert H back to polynomial notation using a lookup table or a function which implements the calculation described above.

A detailed explanation of Galois field arithmetic as it applies to error correction coding, as well as all the tables of the Galois field elements used here, can be found in Lin and Costello, "Error Control Coding: Fundamentals and Applications", Chapter 2—*Introduction to Algebra,* Chapter 16—*Applications of Block Codes for Error Control in Data Storage Systems,* Appendix A—*Tables of Galois Fields,* Prentice Hall, 1983.

The code search algorithm takes as its input n, the code blocklength in bits, and k, the length of the information word in bits. From these, it computes the number of parity bits, r=n−k. A third input, d, denotes the number of adjacent error detection syndromes used in the code, and will be described later.

The first task of the code search algorithm is to create an addition table of the nonzero elements of $GF(2^r)$. This addition table is a $2^r-1$ row by $2^r-1$ column square matrix, and an example is shown in Table 1 for r=3. Note that the 0 shown in the table is not the zero element of $GF(2^r)$. Instead, it represents $\alpha^0$, or (100), as described above. The zero element of the field (000) cannot be expressed as a finite integer power of $\alpha$; so, instead, an asterisk represents it in the table. Row and column heading are included for clarity. The table was constructed with $p(x)=1+x+x^3$.

TABLE 1

|   | 0 | 1 | 2 | 3 | 4 | 5 | 6 |
|---|---|---|---|---|---|---|---|
| 0 | * | 3 | 6 | 1 | 5 | 4 | 2 |
| 1 | 3 | * | 4 | 0 | 2 | 6 | 5 |
| 2 | 6 | 4 | * | 5 | 1 | 3 | 0 |
| 3 | 1 | 0 | 5 | * | 6 | 2 | 4 |
| 4 | 5 | 2 | 1 | 6 | * | 0 | 3 |
| 5 | 4 | 6 | 3 | 2 | 0 | * | 1 |
| 6 | 2 | 5 | 0 | 4 | 3 | 1 | * |

The next step is to partition the set of all nonzero syndromes S into sets H and D, each initially empty. The algorithm is designed to create systematic codes. As described earlier, systematic block codes require that the first r columns of the parity check matrix form the identity matrix $I_r$.

What, exactly, are the "systematic" correction syndromes added to H? In polynomial notation, they will be the r r-bit elements (100 ... 00), (010 ... 00), ..., (000 ... 01). They can also be specified in exponential notation. This is because each of these syndromes is a polynomial with only one term, and a degree between 0 and r−1, inclusive. So, regardless of the degree r minimal polynomial $p(x)$ chosen to construct the field, the remainder of these one-term polynomial syndromes, when divided by $p(x)$, will just be the syndromes themselves. Therefore, the elements $\{0, 1, \ldots, r-1\}$ can always be initially added to H.

What are the "systematic" detection syndromes added to D? In polynomial notation, they will be the r−1 r-bit elements (110 . . . 00), (011 . . . 0), . . . , (000 . . . 11). The exponential notation for these elements, however, will depend on the minimal polynomial chosen to construct $GF(2^r)$. The best one can do notation-wise is to say that {0+1, 1+2, . . . , (r−2)+(r−1)} are being added to D.

The next step is to choose the remaining adjacent error detection syndromes to add to D. The strategy is to choose error-detection syndromes that occur frequently in the body of the syndrome addition table. A syndrome that appears frequently in the addition table has many combinations of two error correction syndromes that will sum to it. This provides many options for placing different correction syndromes adjacent to each other in H, thereby improving chances to construct it successfully.

Initially, in the body of the addition table, all elements appear with the same frequency, but this is altered by deleting rows and columns from the table. Some syndromes have already been selected to be members of H and D in order to create a systematic code. The rows and columns of the addition table corresponding to these elements may be removed with the exception of the syndrome r−1. This syndrome is the last one in the systematic portion of H (the portion that looks like $I_r$), and it will be the starting vertex of the path through the graph of the code. All previous members of H do not need to be considered in the addition table because it is already known that the path through them will be (0, 1, . . . , r−1), which will generate the adjacent error detection syndromes {0+1, 1+2, . . . , (r−2)+(r−1)} along the way. However, at vertex r−1, the next vertex to visit must be chosen; therefore, it is necessary to know which vertices are adjacent. Towards this end, the rows and columns of the addition table associated with correction syndromes {0, 1, . . . , r−2} and detection syndromes {0+1, 1+2, . . . , (r−2)+(r−1)} are removed.

Upon removing rows and columns, the elements in the body of the addition table will no longer appear with equal frequency. The deleted rows and columns will remove more occurrences of some syndromes than others. The syndromes that appear most frequently in the modified addition table should be chosen for members of D, because more pairs of the remaining correction syndromes will sum to these elements. This "greedy" strategy would seem to make the task of finding a Hamiltonian path in the graph of the error correction syndromes as easy as possible, since it translates to adding the most edges to the graph. One would not want to choose a syndrome that occurred only a few times in the addition table as an adjacent detection syndrome, because this would mean that only a few pairs of correction syndromes would sum to it if placed next to each other in H.

After selecting the most frequently appearing syndrome and adding it to D, its rows and columns are deleted from the addition table. This is because one does not care what it sums to when added to correction syndromes; one only cares what pairs of correction syndromes sum to it. In this manner, the most frequently appearing syndromes are selected from the addition table, and their rows and columns deleted until D has been filled.

As mentioned, one can select as many as $2^r−n−1$ syndromes to fill D. In forming a systematic code, r−1 of these have already been determined; therefore, up to $2^r−n−r$ additional adjacent error detection syndromes may be selected. However, due to the nature of the Hamiltonian path problem, one may want to choose less than this number. The algorithm input parameter d denotes the number actually chosen, and it can be any number from r−1 to $2^r−n−1$, inclusive. The reason that one may want to choose less than the maximum number of adjacent error detection syndromes is that the average number of edges leaving a vertex is related to the number of elements in D. Having more elements in D results in a more complex graph, and a more complex graph takes longer to search for a Hamiltonian path. Ideally, one would always want to select the maximum number of elements to fill D, but, practically, that may not be feasible due to very long algorithm run times. If one chooses d to be less than $2^r−n−1$, S is no longer being partitioned into H and D. That is, not every element in S is an element in one of either H or D (but not both). Some elements of S will not appear in H or D and will instead be general error detection syndromes, but not adjacent error detection syndromes. Once D is filled with d syndromes, the greedy search for detection syndromes is over, and one proceeds to the next phase of the algorithm.

At this point, H contains {0, 1, . . . , r−1}, and D contains d adjacent error detection syndromes. The addition table has been pared down to only those rows and columns which do not appear in H (with the exception of r−1) and do not appear in D. One final alteration is now made to the addition table: any element in its body that is not a member of D is replaced by −1. What started as the addition table for the code's syndromes has now been transformed into the adjacency matrix (A) for the graph (G) of the code. The adjacency matrix completely describes G. Each vertex in G has a corresponding row and column in A; two vertices have an edge between them if and only if the intersection of their respective row and column is not −1. If the intersection is not −1, then it is the member of D to which they sum, the two vertices are connected by an edge in the graph, and they may be placed adjacently in H.

Now that the adjacency matrix has been generated, the search for a Hamiltonian path in the graph can begin. As a path is traced through the graph, each vertex visited is added to the end of set H. If n vertices are visited, then H is H, and the parity check matrix for an (n, k) code has been constructed. However, the Hamiltonian path search procedure may also determine that no such path is present in the graph, or run indefinitely in its search for a path. In these cases, the algorithm fails at producing an (n, k) code.

The Hamiltonian path search procedure of the present invention is a basic "dumb" brute force search method. The procedure initializes a length n−r=k vector of integers called C (for Choice) with zeroes. A vertex will generally have more than one edge leaving it, and C stores an integer denoting which edge is currently being used in the overall path. The integer corresponds to the currently selected edge's order of appearance in a column of A, respective to the other edges, as one moves down a column of A. For example, if vertex a is connected to vertices x, y, and z, and x<y<z, then the edge to x will be numbered 1, the edge to y will be 2, and the edge to z will be 3.

The search begins at vertex r−1, which can be denoted as $v_1$, indicating it is the first vertex in the path. (This is not strictly true. Vertices 0, 1, . . . , r−2 precede it in the path, but there was no choice in visiting them. Vertex $v_1$ more correctly denotes the first vertex in the path where we can make a choice which vertex to visit next.) The procedure selects the first path out of r−1, and sets C(1) equal to 1. The new vertex is added to H, and the process continues until H contains n elements or the current vertex has no edges leaving it. If vertex $v_{i+1}$ has no edges leaving it, the search procedure backs up to the previous vertex in the path $v_i$, increments C(i), resets C(i+1) to 0, deletes the (i+1)$^{th}$ element of H and attempts to extend the path using this new edge. If there are no additional unexplored edges leaving $v_i$, the procedure backs up again to $v_{i-1}$. In this manner, the path is explored until (1) n syndromes have been added to H, or (2) the procedure returns to $v_1$ and has no more unexplored edges, indicating that no Hamiltonian path exists. For large n, r, or d, a third, and possibly more likely alternative, is that the search procedure will not terminate in an acceptable amount of time and must be "halted artificially" by the user.

Figure 1B:
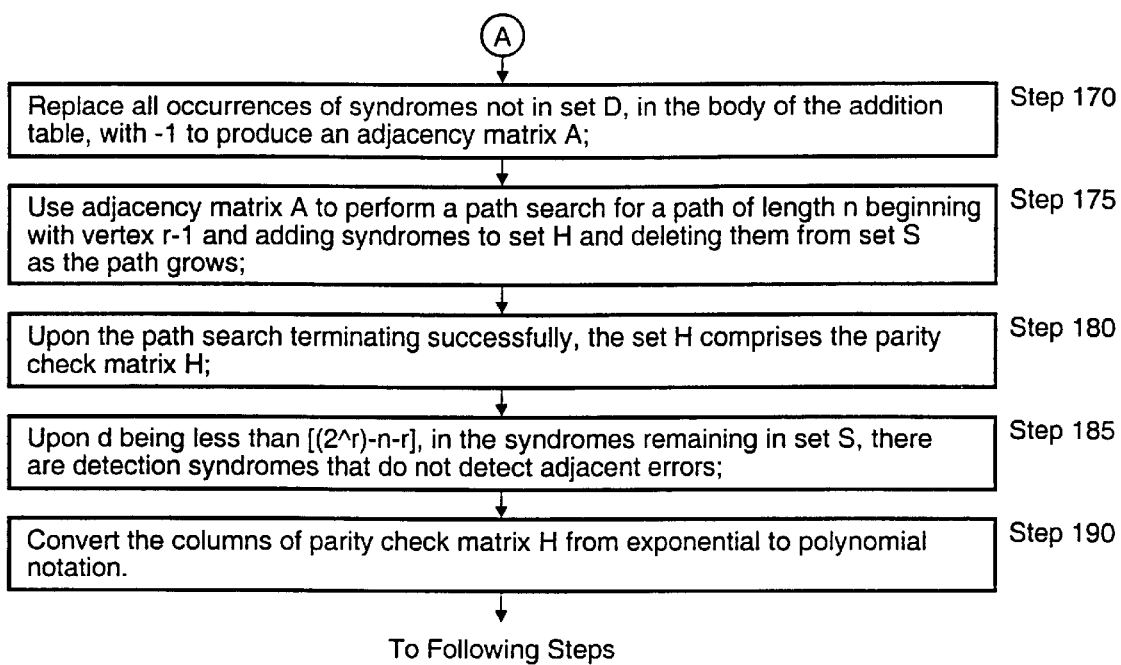

This is a full description of the code search technique in accordance with an example of the present invention. It is summarized below. The steps in parenthesis are those shown in FIG. 1.

1. Provide values for n, k, and d (step 105).
2. Calculate the number of parity bits r=n-k (step 110).
3. Perform a check to ensure that $r-1 \leq d \leq 2^r-n-1$ (step 115).
4. Construct the addition table for the nonzero elements of GF($2^r$) for a chosen minimal polynomial p(x), with the syndromes expressed in exponential notation (step 120).
5. Form the set S, initially containing all nonzero syndromes and used as a reference/label for the rows and columns of the addition table (step 125).
6. Create the sets H (error correction syndromes) and D (adjacent error detection syndromes), each initially empty (step 130).
7. Add the systematic error correction syndromes {0, 1, . . . , r-1} to H, and delete {0, 1, . . . , r-2} from S, as well as their corresponding rows and columns from the addition table (step 135).
8. Add the systematic adjacent error detection syndromes {0+1, 1+2, . . . , (r-2)+(r-1)} to D, and delete them from S and the addition table (step 140).
9. Find the syndrome that occurs most frequently in the addition table but is not a member of D (step 145).
10. Add that syndrome to D (step 150).
11. Delete that syndrome from S (step 155).
12. Delete the corresponding row and column of that syndrome from the addition table (step 160).
13. If the number of elements in set D is less than d, then return to step 9. Otherwise continue to the following step (step 165).
14. Replace all occurrences of syndromes not in D, in the body of the addition table, with -1. The result is the adjacency matrix A (step 170).
15. Use A to perform a Hamiltonian path search for a path of length n beginning with vertex r-1 and adding syndromes to H and deleting them from S as the path grows (step 175).
16. If the search terminates successfully, the set H is the parity check matrix H (step 180).
17. If $d<2^r-n-r$, any syndromes remaining in S are error detection syndromes that do not detect adjacent errors (step 185).
18. Convert the columns of H from exponential to polynomial notation (step 190).

The Hamiltonian path search in step 15 is described in the text above, but any similar but more efficient search may be substituted.

As an example, a (10,6) code will be constructed in accordance with the present invention.

1–3. Set n=10,k=6, and with $(r-1=3) \leq d \leq (2^r-n-1=2^4-10-1=5)$, one chooses, for example, the maximum d=5.
4. With $p(x)=1+x+x^4$, the addition table for GF($2^4$) in exponential format is shown in Table 2. Row and column headings are included for clarity.
5.–6. Initialize S={0, 1, 2, 3, 4, 5, 6, 7, 8, 9, 10, 11, 12, 13, 14}, and H=D=ø (the empty set).
7.–8. After completion of step 8, S={7, 8, 9, 10, 11, 12, 13, 14}, H={0, 1, 2, 3}, and D={4, 5, 6}. The updated addition table is shown in Table 3.

TABLE 2

|    | 0  | 1  | 2  | 3  | 4  | 5  | 6  | 7  | 8  | 9  | 10 | 11 | 12 | 13 | 14 |
|----|----|----|----|----|----|----|----|----|----|----|----|----|----|----|----|
| 0  | *  | 4  | 8  | 14 | 1  | 10 | 13 | 9  | 2  | 7  | 5  | 12 | 11 | 6  | 3  |
| 1  | 4  | *  | 5  | 9  | 0  | 2  | 11 | 14 | 10 | 3  | 8  | 6  | 13 | 12 | 7  |
| 2  | 8  | 5  | *  | 6  | 10 | 1  | 3  | 12 | 0  | 11 | 4  | 9  | 7  | 14 | 13 |
| 3  | 14 | 9  | 6  | *  | 7  | 11 | 2  | 4  | 13 | 1  | 12 | 5  | 10 | 8  | 0  |
| 4  | 1  | 0  | 10 | 7  | *  | 8  | 12 | 3  | 5  | 14 | 2  | 13 | 6  | 11 | 9  |
| 5  | 10 | 2  | 1  | 11 | 8  | *  | 9  | 13 | 4  | 6  | 0  | 3  | 14 | 7  | 12 |
| 6  | 13 | 11 | 3  | 2  | 12 | 9  | *  | 10 | 14 | 5  | 7  | 1  | 4  | 0  | 8  |
| 7  | 9  | 14 | 12 | 4  | 3  | 13 | 10 | *  | 11 | 0  | 6  | 8  | 2  | 5  | 1  |
| 8  | 2  | 10 | 0  | 13 | 5  | 4  | 14 | 11 | *  | 12 | 1  | 7  | 9  | 3  | 6  |
| 9  | 7  | 3  | 11 | 1  | 14 | 6  | 5  | 0  | 12 | *  | 13 | 2  | 8  | 10 | 4  |
| 10 | 5  | 8  | 4  | 12 | 2  | 0  | 7  | 6  | 1  | 13 | *  | 14 | 3  | 9  | 11 |
| 11 | 12 | 6  | 9  | 5  | 13 | 3  | 1  | 8  | 7  | 2  | 14 | *  | 0  | 4  | 10 |
| 12 | 11 | 13 | 7  | 10 | 6  | 14 | 4  | 2  | 9  | 8  | 3  | 0  | *  | 1  | 5  |
| 13 | 6  | 12 | 14 | 8  | 11 | 7  | 0  | 5  | 3  | 10 | 9  | 4  | 1  | *  | 2  |
| 14 | 3  | 7  | 13 | 0  | 9  | 12 | 8  | 1  | 6  | 4  | 11 | 10 | 5  | 2  | *  |

9.–13. In steps 9–13, first 8 and then 10 will be added to D. Upon continuing to step 14, S={7, 9, 11, 12, 13, 14}, and D={4, 5, 6, 8, 10}. The rows and columns corresponding to syndromes 8 and 10 are removed from the addition table.

14. All syndromes except those in D are replaced with -1 to form A, and it is shown in Table 4.

15.–17. A Hamiltonian path through the graph is displayed in FIG. 2 (it is not unique). Each numbered circle corresponds to a vertex in the graph, the number specifying the exponential notation of the vertex's syndrome. Lines between vertices indicate edges in the adjacency matrix, and the darkened lines indicate the Hamiltonian path found by the search procedure. Numbers along the graph's edges indicate the adjacent error detection syndrome to which the connected vertices sum. Note that detection syndrome 6 appears only once along the path (between vertices 2 and 3), so the exact 2-bit adjacent error which produced it can be corrected. Upon completion of the path search, H={0, 1, 2, 3, 7, 11, 13, 9, 12, 14}; this is the parity check matrix of the code in exponential notation. At the completion of the path search, S=ø, since d was set to its maximum valid value.

Figures 2, 3:
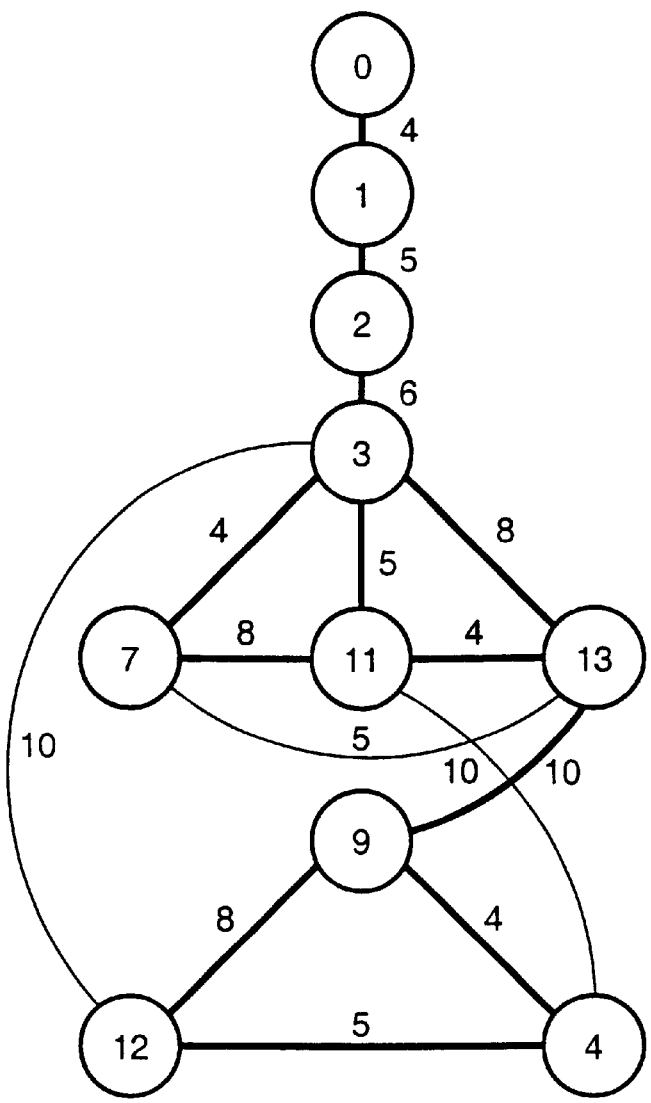
FIG. 2 illustrates one example of a Hamiltonian path in accordance with an example embodiment of the present invention.
FIG. 3 illustrates one example parity check matrix for a (10, 6) code.

18. H is converted to polynomial notation and is shown in FIG. 3. Row 1 of H contains the coefficients of $\alpha^0$ and row r contains the coefficients of $\alpha^{r-1}$ for the error correction syndrome forming each column.

Table 5 displays the parameters for codes generated in accordance with the present invention. Table 6 lists the parity check matrices, in exponential notation, of several codes. In addition, any of the codes listed may be shortened from (n, k) codes to (n−1, k−1) codes, where 1 is an integer. A code is shortened simply by removing 1 columns from the rightmost end of the code's parity check matrix.

TABLE 3

|    | 3  | 7  | 8  | 9  | 10 | 11 | 12 | 13 | 14 |
|----|----|----|----|----|----|----|----|----|----|
| 3  | *  | 4  | 13 | 1  | 12 | 5  | 10 | 8  | 0  |
| 7  | 4  | *  | 11 | 0  | 6  | 8  | 2  | 5  | 1  |
| 8  | 13 | 11 | *  | 12 | 1  | 7  | 9  | 3  | 6  |
| 9  | 1  | 0  | 12 | *  | 13 | 2  | 8  | 10 | 4  |
| 10 | 12 | 6  | 1  | 13 | *  | 14 | 3  | 9  | 11 |
| 11 | 5  | 8  | 7  | 2  | 14 | *  | 0  | 4  | 10 |
| 12 | 10 | 2  | 9  | 8  | 3  | 0  | *  | 1  | 5  |
| 13 | 8  | 5  | 3  | 10 | 9  | 4  | 1  | *  | 2  |
| 14 | 0  | 1  | 6  | 4  | 11 | 10 | 5  | 2  | *  |

TABLE 4

|    | 3  | 7  | 9  | 11 | 12 | 13 | 14 |
|----|----|----|----|----|----|----|----|
| 3  | −1 | 4  | −1 | 5  | 10 | 8  | −1 |
| 7  | 4  | −1 | −1 | 8  | −1 | 5  | 1  |
| 9  | −1 | −1 | −1 | −1 | 8  | 10 | 4  |
| 11 | 5  | 8  | −1 | −1 | −1 | 4  | 10 |
| 12 | 10 | −1 | 8  | −1 | −1 | −1 | 5  |
| 13 | 8  | 5  | 10 | 4  | −1 | −1 | −1 |
| 14 | −1 | −1 | 4  | 10 | 5  | −1 | −1 |

TABLE 5

| BLOCK LENGTH n | MESSAGE LENGTH k | PARITY BITS r = n − k | ADJACENT ERROR DETECTION SYNDROMES d |
|---|---|---|---|
| 10  | 6   | 4 | 5  |
| 25  | 20  | 5 | 6  |
| 56  | 50  | 6 | 7  |
| 110 | 103 | 7 | 12 |
| 222 | 214 | 8 | 20 |

TABLE 6

| CODE (n, k) | MINIMAL POLYNOMAL p(x) | PARITY CHECK MATRIX H |
|---|---|---|
| (10, 6) | $1 + x + x^4$ | [0 1 2 3 7 11 13 9 12 14] |
| (25, 20) | $1 + x^2 + x^5$ | [0 1 2 3 4 13 9 14 10 7 17 15 25 22 28 12 27 8 6 29 23 26 16 24 30] |
| (56, 50) | $1 + x + x^6$ | [0 1 2 3 4 5 11 16 14 24 32 13 18 54 33 19 38 28 37 23 31 17 36 27 35 21 20 34 15 40 43 46 22 30 39 42 58 47 51 55 25 62 60 57 29 50 61 59 48 52 45 56 49 41 44 53] |

Table 7 shows some of the information in Table 5, as well as the parameters for several Hsaio codes. Hsaio codes can cprrect a single error and detect any 2-bit errors. However, Hsaio codes have much shorter blocklengths than the codes developed here for a given number of parity bits. In aplications where errors in memory are caused by high energy particles striking and disrupting the memory elements, adjacent 2-bit errors are by far the most common multiple weight errors (see O'Gorman et al., "Field Testing for Cosmic Ray Soft Errors in Semiconductor Memories," *IBM J. Res. Develop.*, Vol. 40, No. 1, Feb. 28, 1995, and Ziegler et al., "Effects of Cosmic Rays on Computer Memories," *Science*, Vol. 206, Nov. 16, 1975). Therefore, the added parity in Hsaio codes has marginal value in these applications.

TABLE 7

| PARITY BITS r = n − k | LONGEST BLOCKLENGTH n | RATE n/k | LONGEST HSAIO BLOCKLENGTH n | RATE n/k |
|---|---|---|---|---|
| 4 | 10  | 0.600 | 8   | 0.500 |
| 5 | 25  | 0.800 | 16  | 0.688 |
| 6 | 56  | 0.893 | 32  | 0.778 |
| 7 | 110 | 0.936 | 64  | 0.891 |
| 8 | 222 | 0.964 | 128 | 0.938 |

The codes developed here are high rate and suitable for applications where the most common multiple weight error is a 2-bit burst error. The codes provide protection against the most common error events with a minimum of parity added to the instruction word. The algorithm presented here allows for the construction of codes to fit very general information word and code word lengths, including word lengths commonly used in microprocessor and CPU boards, as well as other non-standard lengths. In addition, the algorithm constructs systematic codes, which provide greatly enhanced decoding speeds. The codes have a wide range of applications for data storage.

This concludes the description of the example embodiments. Although the present invention has been described with reference to illustrative embodiments thereof, it should be understood that numerous other modifications and embodiments can be devised by those skilled in the art that fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

I claim:

1. A method of generating a parity check matrix H for a single-bit error-correcting, two-bit burst error-detecting code, the method comprising:

a—select values for n, k, and d, wherein n is the block length of the code in bits and k is the length of the information word in the code in bits and d is the number of adjacent error detection syndromes;

b—calculate the number of parity bits r=n−k;

c—check to insure that r−1 is less than or equal to d which is less than or equal to [($2^r$)−n−1]

d—construct an addition table for the nonzero elements of GF($2^r$) for a chosen minimal polynomial p(x) with the syndromes expressed in exponential notation, wherein GF is a Galois Field;

e—form the set S, the set S initially containing all nonzero syndromes and used as a reference for the rows and columns of the addition table;

f—form the sets H and D, the sets H and D each initially empty, wherein the set H contains error correction syndromes and the set D contains adjacent error detection syndromes;

g—add syndromes [0, 1, . . . , r−1] to set H and delete syndromes [0, 1, . . . , r−2] from set S as well as their corresponding rows and columns from the addition table;

h—add syndromes [0+1, 1+2, . . . , (r−2)+(r−1)] to set D and delete them from set S and the addition table;

i—upon the number of elements in set D being less than d, find a syndrome that occurs most frequently in the addition table but is not a member of set D;

j—add the syndrome that occurs most frequently to set D;

k—delete the syndrome that occurs most frequently from set S;

l—delete the corresponding row and column of the syndrome that occurs most frequently from the addition table;

m—determine if the number of elements in set D is less than d; if so, return to step i and if not, continue with the following step;

n—replace all occurrences of syndromes not in set D, in the body of the addition table, with −1 to produce an adjacency matrix A;

o—use the adjacency matrix A to perform a path search for a path of length n beginning with vertex r−1 and adding syndromes to set H and deleting them from set S as the path grows;

p—upon the path search terminating successfully, the set H comprises the parity check matrix H;

q—upon d being less than $[(2^r)-n-r]$, in the syndromes remaining in set S, there are detection syndromes that do not detect adjacent errors; and r—convert the columns of parity check matrix H from exponential to polynomial notation.

2. The method of claim 1, wherein the path search comprises a Hamiltonian path search.

3. A single bit error correction, double burst error detection method comprising:

a—receive an n bit code word which may contain errors, said received n bit code word including k bits of actual information and r parity bits for error detection and correction;

b—select a value for the number of adjacent error detection syndromes d;

c—check to insure that r−1 is less than or equal to d which is less than or equal to $[(2^r)-n-1]$;

d—construct an addition table for the nonzero elements of $GF(2^r)$ for a chosen minimal polynomial p(x) with the syndromes expressed in exponential notation, wherein GF is a Galois Field;

e—form the set S, the set S initially containing all nonzero syndromes and used as a reference for the rows and columns of the addition table;

f—form the sets H and D, the sets H and D each initially empty, wherein the set H contains error correction syndromes and the set D contains adjacent error detection syndromes;

g—add syndromes [0, 1, . . . r−1] to set H and delete syndromes [0, 1, . . . , r−2] from set S as well as their corresponding rows and columns from the addition table;

h—add syndromes [0+1, 1+2, . . . , (r−2)+(r−1)] to set D and delete them from set S and the addition table;

i—find a syndrome that occurs most frequently in the addition table but is not a member of set D;

j—add the syndrome that occurs most frequently to set D;

k—delete the syndrome that occurs most frequently from set S;

l—delete the corresponding row and column of the syndrome that occurs most frequently from the addition table;

m—determine if the number of elements in set D is less than d; if so, return to step i and if not, continue with the following step;

n—replace all occurrences of syndromes not in set D, in the body of the addition table, with −1 to produce an adjacency matrix A;

o—use the adjacency matrix A to perform a path search for a path of length n beginning with vertex r−1 and adding syndromes to set H and deleting them from set S as the path grows;

p—upon the path search terminating successfully, the set H comprises the parity check matrix H;

q—upon d being less than $[(2^r)-n-r]$, in the syndromes remaining in set S, there are detection syndromes that do not detect adjacent errors; and r—convert the columns of parity check matrix H from exponential to polynomial notation;

s—multiply the received code word by the parity check matrix H to produce a syndrome corresponding to one of the sets of syndromes H and D if the received word contains an error, each single bit error in the received word corresponding one-to-one with a member of the set of syndromes H and each two bit adjacent error in the received word corresponding non-uniquely to a member of the set of syndromes D, and a syndrome containing all zeros if the received word contains no errors;

t—correcting the k bits of actual information of the received word by inverting a bit containing an error if the produced syndrome corresponds to the set of syndromes H;

u—reporting an uncorrectable two bit adjacent error in the received word if the produced syndrome corresponds to the set of syndromes D; and v—reporting an uncorrectable multiple bit error in the received word if the produced syndrome corresponds to neither the set of syndromes H, nor the set of syndromes D, nor the syndrome containing all zeros; and w—reporting no error in the received word if the produced syndrome contains all zeros.

4. The method of claim 3, wherein the path search comprises a Hamiltonian path search.

5. A method of generating a parity check matrix for a single-bit error-correcting, two-bit burst error-detecting code, the method comprising:

a—select values for n, k, and d, wherein n is the block length of the code in bits and k is the length of the information word in the code in bits and d is the number of adjacent error detection syndromes;

b—check to insure that r−1 is less than or equal to d which is less than or equal to $[(2^r)-n-1]$;

c—construct an addition table for the nonzero elements of $GF(2^r)$ for a chosen minimal polynomial p(x) with the syndromes expressed in exponential notation, wherein GF is a Galois Field;

d—form the set S, the set S initially containing all nonzero syndromes and used as a reference for the rows and columns of the addition table;

e—form the sets H and D, the sets H and D each initially empty, wherein the set H contains error correction syndromes and the set D contains adjacent error detection syndromes;

f—find a syndrome that occurs most frequently in the addition table but is not a member of set D;

g—add the syndrome that occurs most frequently to set D;

h—delete the syndrome that occurs most frequently from set S;

i—delete the corresponding row and column of the syndrome that occurs most frequently from the addition table;

j—determine if the number of elements in set D is less than d; if so, return to step i and if not, continue with the following step;

k—replace all occurrences of syndromes not in set D, in the body of the addition table, with −1 to produce an adjacency matrix A;

l—use the adjacency matrix A to perform a path search for a path of length n beginning with vertex r−1 and adding syndromes to set H and deleting them from set S as the path grows;

m—upon the path search terminating successfully, the set H comprises the parity check matrix H; and n—convert the columns of parity check matrix H from exponential to polynomial notation.

6. The method of claim 5, wherein the path search comprises a Hamiltonian path search.

7. A single bit error correction, double burst error detection method comprising:

a—receive an n bit code word which may contain errors, said received n bit code word including k bits of actual information and r parity bits for error detection and correction;

b—select a value for the number of adjacent error detection syndromes d;

c—check to insure that r−1 is less than or equal to d which is less than or equal to $[(2^r)-n-1]$;

d—construct an addition table for the nonzero elements of $GF(2^r)$ for a chosen minimal polynomial p(x) with the syndromes expressed in exponential notation, wherein GF is a Galois Field;

e—form the set S, the set S initially containing all nonzero syndromes and used as a reference for the rows and columns of the addition table;

f—form the sets H and D, the sets H and D each initially empty, wherein the set H contains error correction syndromes and the set D contains adjacent error detection syndromes;

g—find a syndrome that occurs most frequently in the addition table but is not a member of set D;

h—add the syndrome that occurs most frequently to set D;

i—delete the syndrome that occurs most frequently from set S;

j—delete the corresponding row and column of the syndrome that occurs most frequently from the addition table;

k—determine if the number of elements in set D is less than d; if so, return to step i and if not, continue with the following step;

l—replace all occurrences of syndromes not in set D, in the body of the addition table, with −1 to produce an adjacency matrix A;

m—use the adjacency matrix A to perform a path search for a path of length n beginning with vertex r−1 and adding syndromes to set H and deleting them from set S as the path grows;

n—upon the path search terminating successfully, the set H comprises the parity check matrix H; and o—convert the columns of parity check matrix H from exponential to polynomial notation;

p—multiply the received code word by the parity check matrix H to produce a syndrome corresponding to one of the sets of syndromes H and D if the received word contains an error, each single bit error in the received word corresponding one-to-one with a member of the set of syndromes H and each two bit adjacent error in the received word corresponding non-uniquely to a member of the set of syndromes D, and a syndrome containing all zeros if the received word contains no errors;

q—correcting the k bits of actual information of the received word by inverting a bit containing an error if the produced syndrome corresponds to the set of syndromes H;

r—reporting an uncorrectable two bit adjacent error in the received word if the produced syndrome corresponds to the set of symdromes D;

s—reporting an uncorrectable multiple bit error in the received word if the produced syndrome corresponds to neither the set of syndromes H, nor the set of syndromes D, nor the syndrome containing all zeros; and t—reporting no error in the received word if the produced syndrome contains all zeros.

8. The method of claim 7, wherein the path search comprises a Hamiltonian path search.

* * * * *